United States Patent
Lee et al.

(10) Patent No.: US 9,876,461 B2
(45) Date of Patent: Jan. 23, 2018

(54) CONTROL AND PROTECTION APPARATUS FOR ELECTRIC MOTOR

(71) Applicant: Eaton Corporation, Cleveland, OH (US)

(72) Inventors: Kevin Lee, Menomonee Falls, WI (US); Robert A. Fenton, Menomonee Falls, WI (US); Xiaoling Li, Shenzhen (CN); Leo Sun, Shenzhen (CN); Jiankun Xin, Jiang su (CN)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 15/119,047

(22) PCT Filed: Feb. 12, 2015

(86) PCT No.: PCT/CN2015/072841
§ 371 (c)(1),
(2) Date: Aug. 15, 2016

(87) PCT Pub. No.: WO2015/120801
PCT Pub. Date: Aug. 20, 2015

(65) Prior Publication Data
US 2016/0359445 A1 Dec. 8, 2016

(30) Foreign Application Priority Data

Feb. 17, 2014 (CN) .......................... 2014 1 0053859

(51) Int. Cl.
*H02P 3/00* (2006.01)
*H02P 5/00* (2016.01)
(Continued)

(52) U.S. Cl.
CPC ............ *H02P 29/032* (2016.02); *H02P 27/08* (2013.01); *H02P 29/02* (2013.01); *H02P 29/60* (2016.02)

(58) Field of Classification Search
CPC ...... H02P 29/60; H02P 29/662; H02P 29/032; H02P 29/64; H02P 29/68; H02P 21/16;
(Continued)

(56) References Cited

U.S. PATENT DOCUMENTS 4,689,543 A * 8/1987 Hucker ..................... H02P 1/26
318/798
6,563,288 B2 * 5/2003 Ueno .................. B60L 11/1881
318/783
(Continued)

FOREIGN PATENT DOCUMENTS

CN 201097443 Y 8/2008
CN 101937191 A 1/2011
(Continued)

OTHER PUBLICATIONS

PowerFlex 750-Series ATEX Option Module User Manual, Allen-Bradley, Rockwell Automation Publication 750-UM003B-EN-P, Catalog No. 20-750-ATEX, Jul. 2013, pp. 1-44.

*Primary Examiner* — Paul Ip
(74) *Attorney, Agent, or Firm* — Ziolkowski Patent Solutions Group, SC

(57) ABSTRACT

A control and protection apparatus for an electric motor, comprising an inverter (3), a first converter (1), a temperature detection apparatus (7), and a second converter (2). The first converter (1) is used for generating, on the basis of an input signal, a first control signal to control working of the inverter (3). The temperature detection apparatus (7) is used for detecting the temperature of the electric motor (4) and for acquiring a temperature signal. The second converter (2) is used for generating a second control signal on the basis of (Continued)

the temperature signal detected and for providing the second control signal to the inverter (3). The inverter (3) is used for controlling wording of the electric motor (4) on the basis of the first control signal and of the second control signal. The control and protection apparatus for the electric motor is low in costs and high in safety and reliability.

11 Claims, 4 Drawing Sheets

(51) Int. Cl.
*H02P 29/032* (2016.01)
*H02P 27/08* (2006.01)
*H02P 29/02* (2016.01)
*H02P 29/60* (2016.01)

(58) Field of Classification Search
CPC .......... H02P 23/14; H02P 27/08; H02P 21/00; H02P 21/14; H02P 21/141; H02P 29/0088; H02P 29/66; H02P 29/664; H02P 6/08
USPC .......... 318/472, 400.09, 400.15, 400.37, 473
See application file for complete search history.

(56) References Cited

U.S. PATENT DOCUMENTS

| | | | | |
|---|---|---|---|---|
| 6,960,152 | B2* | 11/2005 | Aoki | B60L 15/20 477/3 |
| 6,965,206 | B2* | 11/2005 | Kamen | A63C 17/12 180/220 |
| 7,157,875 | B2* | 1/2007 | Kamen | A63C 17/12 310/112 |
| 7,353,094 | B2* | 4/2008 | Okoshi | B60K 6/445 180/65.1 |
| 7,852,029 | B2* | 12/2010 | Kato | B60L 11/14 318/400.01 |
| 7,928,679 | B2* | 4/2011 | Rajakangas | H02H 7/0852 318/445 |
| 8,089,234 | B2* | 1/2012 | Takizawa | B60L 15/00 318/139 |
| 8,096,919 | B2* | 1/2012 | Takizawa | B60L 15/20 477/16 |
| 8,138,711 | B2* | 3/2012 | Hwang | F24F 11/0076 318/471 |
| 8,140,280 | B2* | 3/2012 | Kasai | B62D 5/0481 320/134 |
| 8,212,510 | B2* | 7/2012 | Campbell | B60L 3/12 180/65.285 |
| 8,364,349 | B2* | 1/2013 | Ueda | B62D 5/046 318/400.08 |
| 8,421,391 | B2* | 4/2013 | Yeh | G01K 7/42 318/400.15 |
| 8,487,575 | B2* | 7/2013 | Yeh | H02P 6/08 318/432 |
| 8,773,058 | B2* | 7/2014 | Baglino | B60L 15/025 318/434 |
| 2002/0097020 | A1* | 7/2002 | Ueno | B60L 11/1881 318/783 |
| 2003/0071594 | A1* | 4/2003 | Kleinau | B60L 11/14 318/567 |
| 2003/0076061 | A1* | 4/2003 | Kleinau | B62D 5/0496 318/400.21 |
| 2003/0076064 | A1* | 4/2003 | Kleinau | B62D 5/0481 318/567 |
| 2003/0146025 | A1* | 8/2003 | Kamen | A63C 17/12 180/65.1 |
| 2004/0124808 | A1* | 7/2004 | Hirono | H02P 27/08 318/806 |
| 2004/0235613 | A1* | 11/2004 | Aoki | B60L 15/20 477/3 |
| 2004/0249518 | A1* | 12/2004 | Okoshi | B60K 6/445 701/1 |
| 2006/0125433 | A1* | 6/2006 | Kamen | A63C 17/12 318/139 |
| 2008/0074069 | A1* | 3/2008 | Rajakangas | H02H 7/0852 318/473 |
| 2008/0315814 | A1* | 12/2008 | Takizawa | B60L 15/00 318/434 |
| 2009/0058337 | A1* | 3/2009 | Kato | B60L 11/14 318/400.09 |
| 2009/0102405 | A1* | 4/2009 | Hwang | H02P 29/60 318/400.15 |
| 2009/0259419 | A1* | 10/2009 | Kasai | B62D 5/0481 702/63 |
| 2009/0288634 | A1* | 11/2009 | Takizawa | B60L 15/20 123/349 |
| 2010/0280714 | A1* | 11/2010 | Ueda | B62D 5/046 701/41 |
| 2011/0050141 | A1* | 3/2011 | Yeh | H02P 29/664 318/434 |
| 2011/0109256 | A1* | 5/2011 | Campbell | B60L 3/12 318/400.37 |
| 2011/0279074 | A1* | 11/2011 | Yeh | G01K 7/42 318/432 |
| 2012/0146683 | A1* | 6/2012 | Tanimoto | B60L 3/0061 324/765.01 |
| 2013/0147407 | A1* | 6/2013 | Kawamura | H03K 17/0828 318/400.21 |
| 2013/0249460 | A1* | 9/2013 | Sugahara | H02M 7/797 318/472 |
| 2014/0117907 | A1* | 5/2014 | Lee | H03K 7/08 318/471 |
| 2014/0197765 | A1* | 7/2014 | Kim | H02P 29/50 318/400.2 |
| 2014/0361721 | A1* | 12/2014 | Yamaguchi | H02P 29/0088 318/472 |
| 2015/0357954 | A1* | 12/2015 | Kim | H02P 21/141 318/400.02 |
| 2015/0372627 | A1* | 12/2015 | Kim | H02P 21/141 318/801 |

FOREIGN PATENT DOCUMENTS

EP 2367278 A2 9/2011
JP 2010266266 A 11/2010

* cited by examiner

CONTROL AND PROTECTION APPARATUS FOR ELECTRIC MOTOR

TECHNICAL FIELD

The present invention relates to an electric motor and, more particularly, to a control and protection apparatus for an electric motor.

BACKGROUND OF THE INVENTION

An electric motor has been widely used in various fields such as industry and agriculture. In practical applications, the electric motor may experience over temperature due to overload, winding faults or abnormal power voltage so as to damage or destroy the electric motor, and thus the over temperature protection for the electric motor is needed. In addition, the electric motor should be safely stopped when it is in abnormal operation status. That is, a STO (safe torque off) should be applied manually to make the electric motor stop work.

In order to stop the electric motor when it is over temperature or a safe torque off signal is received, the existing control and protection apparatus is usually provided with a control unit comprising a thermistor, an OR gate circuit and a safety circuit, wherein the two input ends of the OR gate circuit are configured to receive the electric motor's temperature signal detected by the thermistor and the safe torque off signal (or safe stop signal) respectively. When the temperature of the electric motor is too high and/or the safe torque off signal applied manually is received, the safety circuit makes the inverter having an insulated gate bipolar transistor (IGBT) stop work, and thus makes the electric motor stop work. In the control and protection apparatus above, the OR gate circuit and the safety circuit need ATEX certification, which may increase the cost of the apparatus. On the other hand, upon a failure of the OR gate circuit, the applied safe torque off signal and/or over temperature of the electric motor will not be able to stop the electric motor, which means the performance of the OR gate circuit must meet higher requirements.

SUMMARY OF INVENTION

In view of the foregoing, an object of the present invention is to provide a control and protection apparatus for an electric motor. The control and protection apparatus for the electric motor comprises a frequency transformer, a first converter, a temperature-detection device and a second converter, wherein the first converter is configured to generate a first control signal from an input signal to control the operation of the frequency transformer, the temperature-detection device is configured to detect the temperature of the electric motor and generate a temperature signal, the second converter is configured to generate a second control signal from the temperature signal, and provide the second control signal to the frequency transformer, and the frequency transformer is configured to control the operation of the electric motor based on the first control signal and the second control signal.

Preferably, the frequency transformer comprises a switching device driver and an inverter, and the switching device driver is configured to provide a pulse width modulation signal to the inverter.

Preferably, the first converter is configured to generate a first stop signal when receiving a safe torque off signal in order to make the switching device driver stop work, and provide a first work signal to the switching device driver for when receiving a no safe torque off signal in order to make the switching device driver work.

Preferably, the second converter is configured to convert the temperature signal of the electric motor to a second stop signal when the temperature of the electric motor is higher than a threshold in order to make the switching device driver stop work, and convert the temperature signal of the electric motor to a second work signal when the temperature of the electric motor is not higher than the threshold in order to make the switching device driver work.

Preferably, the first stop signal is a pulse width modulation disenable signal input to the switching device driver, and the first work signal is a pulse width modulation enable signal input to the switching device driver.

Preferably, the second work signal is a pulse width modulation input signal input into the switching device driver, and the second stop signal is a voltage signal to make the switching device driver stop work.

Preferably, the frequency transformer further comprises a switch power supply, which is configured to provide a required direct current to the switching device driver.

Preferably, the first stop signal is a pulse width modulation disenable signal input to the switching device driver, and the first work signal is a pulse width modulation enable signal input to the switching device driver; the second stop signal is a disenable signal for the switch power supply or a signal for turning-off the input of the switch power supply to make the switch power supply stop work, and the second work signal is an enable signal for the switch power supply or a signal for turning-on the input of the switch power supply to make the switch power supply work.

Preferably, the first stop signal is a disenable signal for the switch power supply or a signal for turning-off the input of the switch power supply to make the switch power supply stop work, and the first work signal is an enable signal for the switch power supply or a signal for turning-on the input of the switch power supply to make the switch power supply work; the second stop signal is a pulse width modulation disenable signal input to the switching device driver, and the second work signal is a pulse width modulation enable signal input to the switching device driver.

Preferably, the first stop signal is one of a disenable signal for the switch power supply and a signal for turning-off the input of the switch power supply to make the switch power supply stop work, and the second stop signal is the other one of the disenable signal for the switch power supply and the signal for turning-off the input of the switch power supply.

Preferably, the switching device driver is an IGBT driver.

The control and protection apparatus for the electric motor of the present invention needs no ATEX certification and thus reduces the production cost. And the safety and reliability are improved for adopting two independent control signals to control the work status of the control switch driver.

BRIEF DESCRIPTION OF DRAWINGS

The present invention will be further explained in combination with the embodiments with reference to the accompanying figures, wherein.

Figure 1:
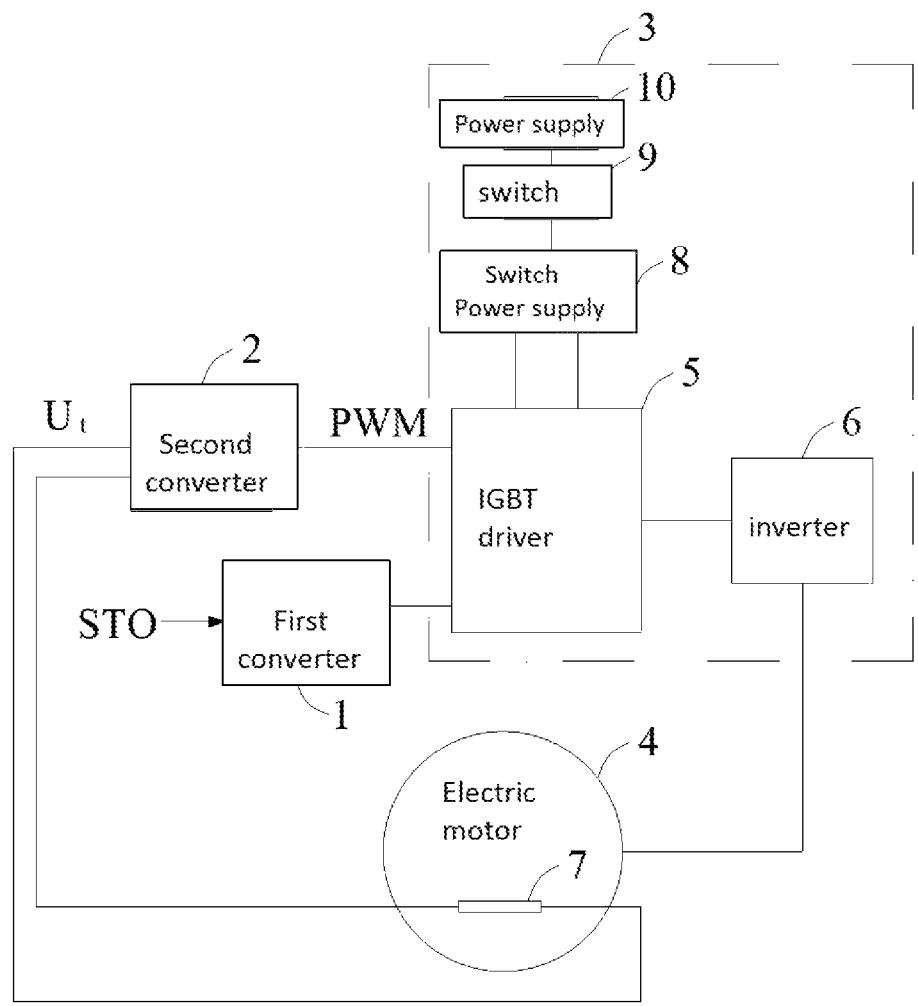
FIG. 1 is a circuit diagram of a control and protection apparatus for an electric motor according to the first embodiment of the present invention.

DENOTATION OF ACCOMPANYING DRAWINGS 1 first converter
2 second converter
3 frequency transformer
4 electric motor
5 IGBT driver
6 inverter
7 thermistor
8 switch power supply
9 switch
10 power supply
22 second converter
31 first converter
32 second converter
41 first converter
42 second converter

DESCRIPTION OF EMBODIMENTS

In the following parts, the present invention will be described in greater details with reference to the embodiments and the accompanying drawings so as to make its objects, solutions and advantages clearer.

FIG. 1 is a circuit diagram of a control and protection apparatus for an electric motor according to the first embodiment of the present invention. As shown in FIG. 1, the control and protection apparatus for the electric motor comprises a first converter 1, a second converter 2, a frequency transformer 3 and a thermistor 7 within the electric motor 4, wherein the frequency transformer 3 comprises a switch power supply 8, a switch 9, a power supply 10, an IGBT driver 5 and an inverter 6. The power supply 10 is connected to an input end of the switch power supply 8 through the switch 9, and an output end of the switch power supply 8 is connected to a driving power supply end of the IGBT driver 5 to provide a required direct current to the IGBT driver 5. The input end of the first converter 1 is used to receive a safe torque off (STO) signal, and the output end thereof is connected to an enable end of the IGBT driver 5. The thermistor 7 is used to measure the temperature of the electric motor 4 and generate a temperature signal $U_t$. An input end of the second converter 2 receives the temperature signal $U_t$, and an output end thereof is connected to a pulse width modulation (PWM) input end of the IGBT driver 5. An output end of the IGBT driver 5 is used to provide a PWM signal or a stop work signal to the IGBT (not shown in the Figures) in the inverter 6, and an output end of the inverter 6 is connected to the electric motor 4.

The input end of the first converter 1 is used to receive an input signal, which may be a safe torque off signal (STO) or a voltage within a predetermined range. Herein the voltage within the predetermined range indicates that no safe torque off (STO) signals are received by the first converter 1. The first converter 1 receives and processes the safe torque off (STO) signal, and outputs a pulse width modulation disenable signal to the enable end of the IGBT driver 5 so as to make the IGBT driver 5 stop work (or NOT work), and then cause the inverter 6 to stop work, and finally make the electric motor 4 stop work. In this embodiment, the first converter 1 outputs a pulse width modulation enable signal when receiving no safe torque off (STO) signal. This pulse width modulation enable signal keeps the IGBT driver 5 in a working state. The pulse width modulation enable signal may be either a low-level voltage of 0V, or a high-level voltage of 5V or 3.3V. In various embodiments, the voltage of the pulse width modulation enable signal may be defined according to the specification of the IGBT driver 5, wherein the pulse width modulation disenable signal is at a low level when the pulse width modulation enable signal is at a high level, or vice versa.

The thermistor 7 is used to measure the temperature of the electric motor 4 and output the acquired temperature signal $U_t$ to the second converter 2, wherein the acquired temperature signal $U_t$ is an analog signal (such as an analog value of voltage). When the temperature of the electric motor 4 is higher than a threshold (such as the maximum working temperature the electric motor 4 can endure), the second converter 2 generates a turn-off voltage such as a fixed low voltage, and the IGBT driver 5 makes the IGBT in the inverter 6 turn off (i.e., makes the inverter stop work) in response to the turn-off voltage, and thus prevents the inverter 6 from supplying to the electric motor 4, so as to make the electric motor 4 stop work. When the temperature of the electric motor 4 is within the working temperature range it can endure, a pulse width modulation input signal is output from the output end of the second converter 2 and provided to a pulse width modulation input end of the IGBT driver 5, so that the inverter 6 provides an alternating current with a variable voltage amplitude and/or frequency to the electric motor 4. In other embodiments of the present invention, the second converter 2 may be in the form of a single chip microcomputer. In the embodiments of the present invention, the safe torque off (STO) signal and the temperature signal $U_t$ of the electric motor 4 (if the temperature of the electric motor 4 is higher than the threshold) are able to independently provide a control signal to the IGBT driver 5 through the first converter 1 and the second converter 2 respectively in order to make the IGBT driver 5 stop providing the pulse width modulation signal to the inverter 6, which will improve the safety and reliability, and further avoid the ATEX certification to the OR gate circuit and the safety circuit, and thus reduce the production cost.

Figure 2:
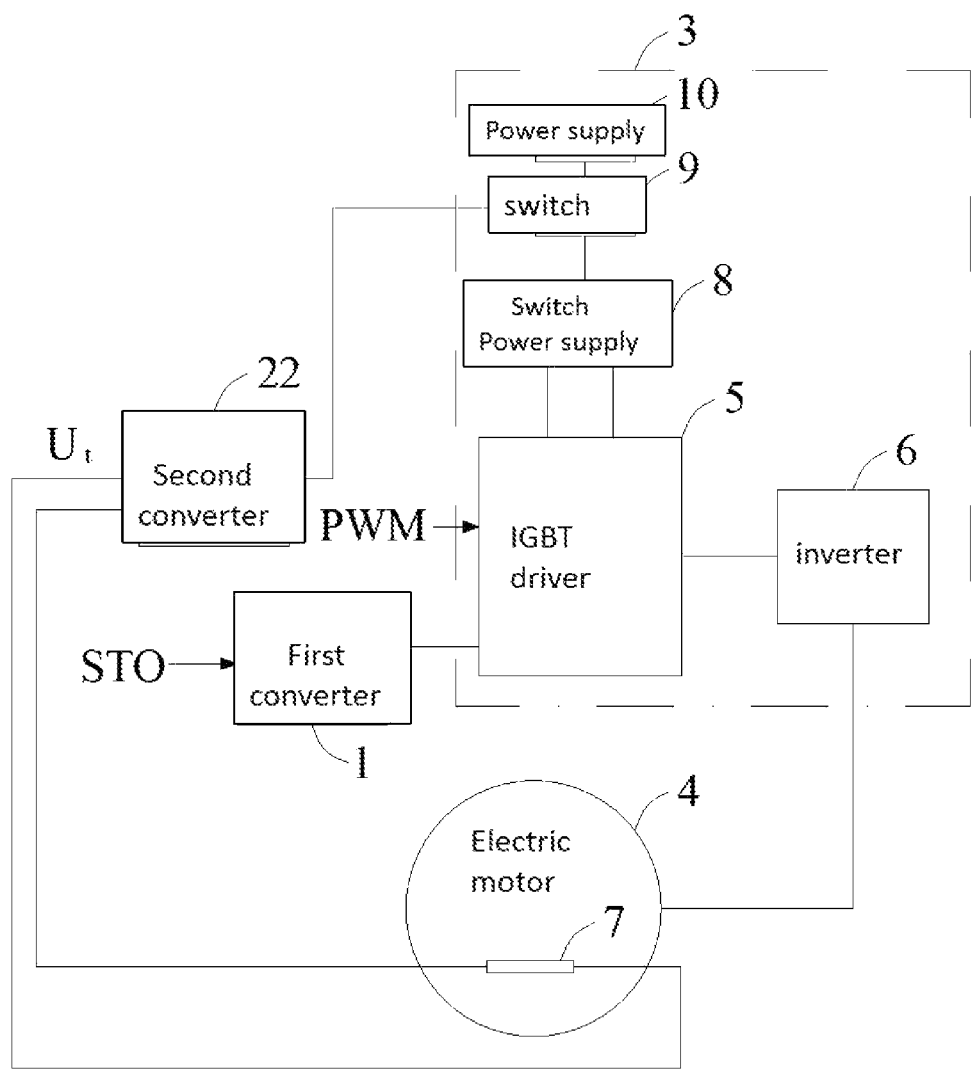
FIG. 2 is a circuit diagram of a control and protection apparatus for an electric motor according to the second embodiment of the present invention.

FIG. 2 is a circuit diagram of a control and protection apparatus for an electric motor according to the second embodiment of the present invention, which is substantially the same as FIG. 1, but is different from FIG. 1 in that an output signal of an output end of a second converter 22 is used for controlling the switch 9 to be switched on or off, and the pulse width modulation input end of the IGBT driver 5 receives a pulse width modulation (PWM) input signal. The thermistor 7 measures the temperature of the electric motor 4 and generates a temperature signal $U_t$. When the temperature of the electric motor 4 is higher than the maximum working temperature it can endure (i.e., the electric motor 4 is over temperature), the output end of the second converter 22 outputs a signal for turning-off the input of a switch power supply. The signal for turning-off the input of the switch power supply controls the switch 9 to be switched off, so that the switch power supply 8 will not provide a required direct current to the IGBT driver 5. Then the IGBT driver 5, the inverter 6 and the electric motor 4 will stop work. In another embodiment, the output end of the second converter 22 is connected to an enable end (not shown in the Figures) of the switch power supply 8. Likewise, when the electric motor 4 is over temperature, the output end of the second converter 22 will output a disenable signal for the switch power supply, which is used to make a switching device (not shown in the Figures) of the switch power supply 8 stop work, and thus make the switch power supply 8 stop providing a required direct current to the IGBT driver 5. In this embodiment, the voltage of the disenable signal for the switch power supply may be chosen according to the specific circuit structure of the switch power supply 8.

Figure 3:
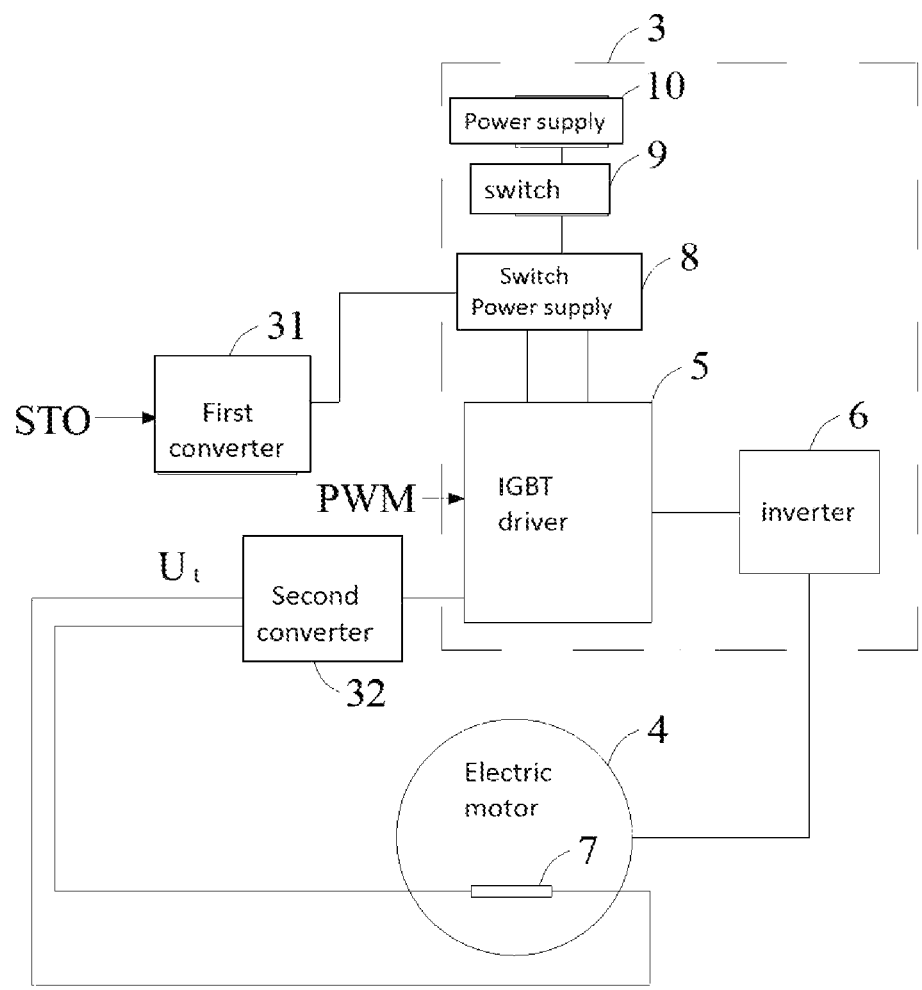
FIG. 3 is a circuit diagram of a control and protection apparatus for an electric motor according to the third embodiment of the present invention.

FIG. 3 is a circuit diagram of a control and protection apparatus for an electric motor according to the third embodiment of the present invention, which is substantially the same as FIG. 1, but is different from FIG. 1 in that an output end of a first converter 31 is connected to an enable end of the switch power supply 8, an output end of a second converter 32 is connected to the enable end of the IGBT driver 5, and the pulse width modulation input end of the IGBT driver 5 receives a pulse width modulation (PWM) input signal. The first converter 31 is used to convert a safe torque off (STO) signal into a disenable signal for the switch power supply, which is used to make a switching device (not shown in the Figures) of the switch power supply 8 stop work, and thus make the switch power supply 8 stop providing a required direct current to the IGBT driver 5. When the temperature of the electric motor 4 is higher than the maximum working temperature it can endure, the output end of the second converter 32 outputs a pulse width modulation disenable signal, which makes the IGBT driver 5 stop work so as to make the inverter 6 and the electric motor 4 stop work. On the contrary, when the temperature of the electric motor 4 is not over a threshold, the output end of the second converter 32 outputs a pulse width modulation enable signal which makes the IGBT driver 5 work. In this embodiment, the IGBT driver 5 and thus the electric motor 4 will stop work when the electric motor 4 is over temperature or when a safe torque off (STO) signal is applied manually. In other embodiments of the present invention, the output signal of the output end of the first converter 31 may be used for controlling the switch 9 to be switched on or off, wherein the first converter 31 is used for converting a safe torque off (STO) signal into a signal for turning-off the input of a switch power supply. The signal for turning-off the input of the switch power supply controls the switch 9 to be switched off, so that the switch power supply 8 will not provide a required direct current to the IGBT driver 5.

Figure 4:
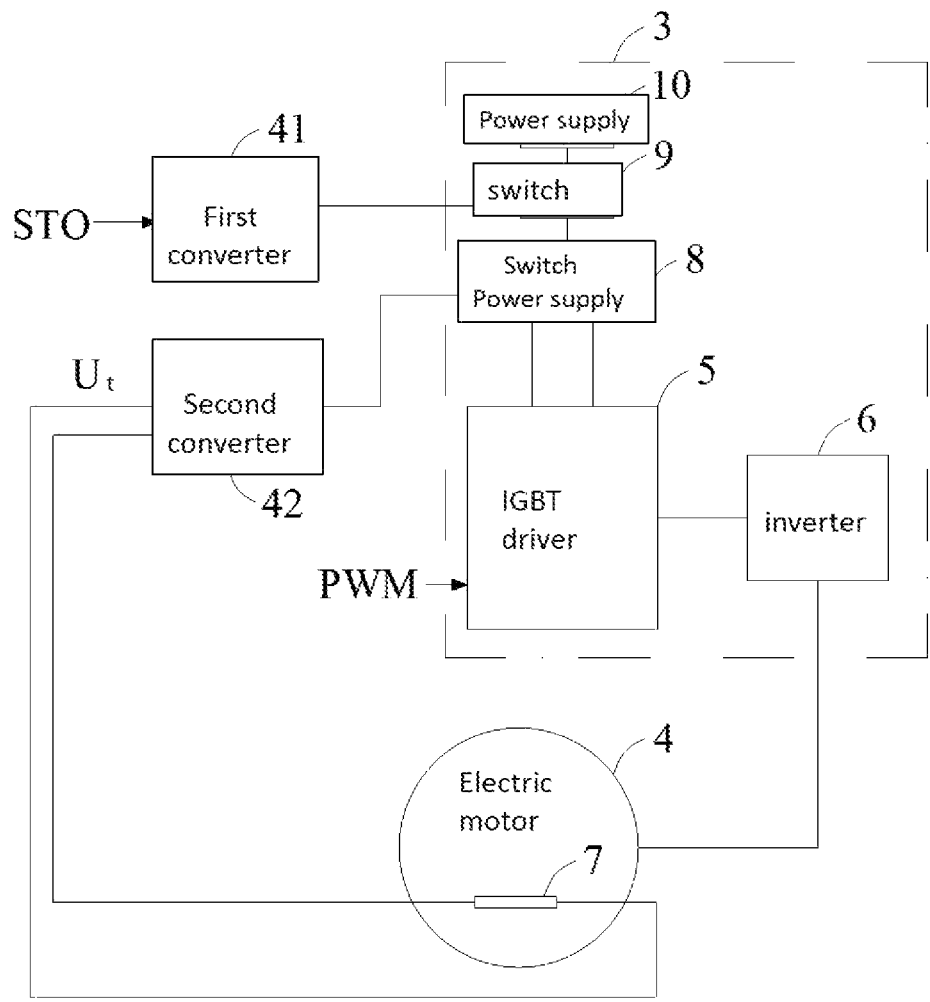
FIG. 4 is a circuit diagram of a control and protection apparatus for an electric motor according to the fourth embodiment of the present invention.

FIG. 4 is a circuit diagram of a control and protection apparatus for an electric motor according to the fourth embodiment of the present invention, which is substantially the same as FIG. 1, but is different from FIG. 1 in that an output end of a second converter 42 is connected to the enable end of the switch power supply 8, the output signal of an output end of a first converter 41 is used for controlling the switch 9 to be switched on or off, and the pulse width modulation input end of the IGBT driver 5 receives a pulse width modulation (PWM) input signal. The first converter 41 generates a signal for turning-off the input of a switch power supply in response to a safe torque off (STO) signal. When the temperature of the electric motor 4 is higher than the maximum working temperature it can endure, the output end of the second converter 42 outputs a disenable signal for the switch power supply, otherwise it outputs an enable signal for the switch power supply. In other embodiments of the present invention, the output end of the first converter 41 is connected to the enable end of the switch power supply 8, and the temperature signal when the electric motor 4 is over temperature is converted into a disenable signal for the switch power supply. Meanwhile, the output signal of the output end of the second converter 42 is used for controlling the switch 9 to be switched on or off. In this embodiment, the safe torque off (STO) signal and the temperature signal $U_t$ are converted into control signals by the first converter 41 and the second converter 42 respectively so as to make the switch power supply 8 stop work, and thus make the IGBT driver 5 stop work.

In the embodiments of the present invention, when there are no safe torque off (STO) signals or the temperature of the electric motor 4 is not higher than the threshold, the IGBT driver 5 provides a pulse width modulation signal to the inverter 6 to control the IGBT in the inverter 6 to be switched on or off, so as to provide a required alternating current to the electric motor 4.

In the above embodiments of the present invention, the IGBT driver 5 may be replaced with other semiconductor switching device drivers, and accordingly, the IGBT in the inverter 6 may be replaced with corresponding semiconductor switching devices. In other embodiments, the thermistor 7 may be replaced with other temperature-measuring devices. It is well known to a person skill in the art that the converters in above embodiments may adopt existing electronic components to realize the corresponding functions of the above converters.

Embodiments of the present invention have been described in terms of the preferred embodiment, but the present invention is not limited to the embodiments described above, and various amendments and changes may be made within the scope of the present invention.

The invention claimed is:

1. A control and protection apparatus for an electric motor comprising:
    a frequency transformer;
    a first converter configured to generate a first control signal from an input signal and provide the first control signal to the frequency transformer;
    a temperature-detection device configured to detect the temperature of the electric motor and generate a temperature signal; and
    a second converter configured to generate a second control signal from the temperature signal and provide the second control signal to the frequency transformer;
    wherein the frequency transformer is configured to control the operation of the electric motor based on the first control signal and the second control signal.

2. The control and protection apparatus for the electric motor according to claim 1, wherein the frequency transformer comprises a switching device driver and an inverter, and the switching device driver is configured to provide a pulse width modulation signal to the inverter.

3. The control and protection apparatus for the electric motor according to claim 2, wherein the first converter is configured to generate a first stop signal when receiving a safe torque off signal in order to make the switching device driver stop work, and provide a first work signal to the switching device driver when receiving a no safe torque off signal in order to make the switching device driver work.

4. The control and protection apparatus for the electric motor according to claim 3, wherein the second converter is configured to convert the temperature signal of the electric motor to a second stop signal when the temperature of the electric motor is higher than a threshold in order to make the switching device driver stop work, and convert the temperature signal of the electric motor to a second work signal when the temperature of the electric motor is not higher than the threshold in order to make the switching device driver work.

5. The control and protection apparatus for the electric motor according to claim 4, wherein the first stop signal is a pulse width modulation disenable signal input to the switching device driver, and the first work signal is a pulse width modulation enable signal input to the switching device driver.

6. The control and protection apparatus for the electric motor according to claim 5, wherein the second work signal is a pulse width modulation input signal input into the switching device driver, and the second stop signal is a voltage signal to make the switching device driver stop work.

7. The control and protection apparatus for the electric motor according to claim 4, wherein the frequency transformer further comprises a switch power supply, which is configured to provide a required direct current to the switching device driver.

8. The control and protection apparatus for the electric motor according to claim 7, wherein the first stop signal is a pulse width modulation disenable signal input to the switching device driver, and the first work signal is a pulse width modulation enable signal input to the switching device driver; and
    wherein the second stop signal is a disenable signal for the switch power supply or a signal for turning-off the input of the switch power supply to make the switch power supply stop work, and the second work signal is an enable signal for the switch power supply or a signal for turning-on the input of the switch power supply to make the switch power supply work.

9. The control and protection apparatus for the electric motor according to claim 7, wherein the first stop signal is a disenable signal for the switch power supply or a signal for turning-off the input of the switch power supply to make the switch power supply stop work, and the first work signal is an enable signal for the switch power supply or a signal for turning-on the input of the switch power supply to make the switch power supply work; and
    wherein the second stop signal is a pulse width modulation disenable signal input to the switching device driver, and the second work signal is a pulse width modulation enable signal input to the switching device driver.

10. The control and protection apparatus for the electric motor according to claim 7, wherein the first stop signal is one of a disenable signal for the switch power supply and a signal for turning-off the input of the switch power supply to make the switch power supply stop work, and the second stop signal is the other one of the disenable signal for the switch power supply and the signal for turning-off the input of the switch power supply.

11. The control and protection apparatus for the electric motor according to claim 2, wherein the switching device driver is an IGBT driver.

* * * * *